Aug. 21, 1934.  N. V. HENDRICKS  1,971,262
DISTRIBUTOR HEAD FOR DISTRIBUTOR TANKS
Filed July 30, 1932  2 Sheets-Sheet 1

Inventor
Nathan V. Hendricks
By
Attorney

Aug. 21, 1934.  N. V. HENDRICKS  1,971,262
DISTRIBUTOR HEAD FOR DISTRIBUTOR TANKS
Filed July 30, 1932   2 Sheets-Sheet 2
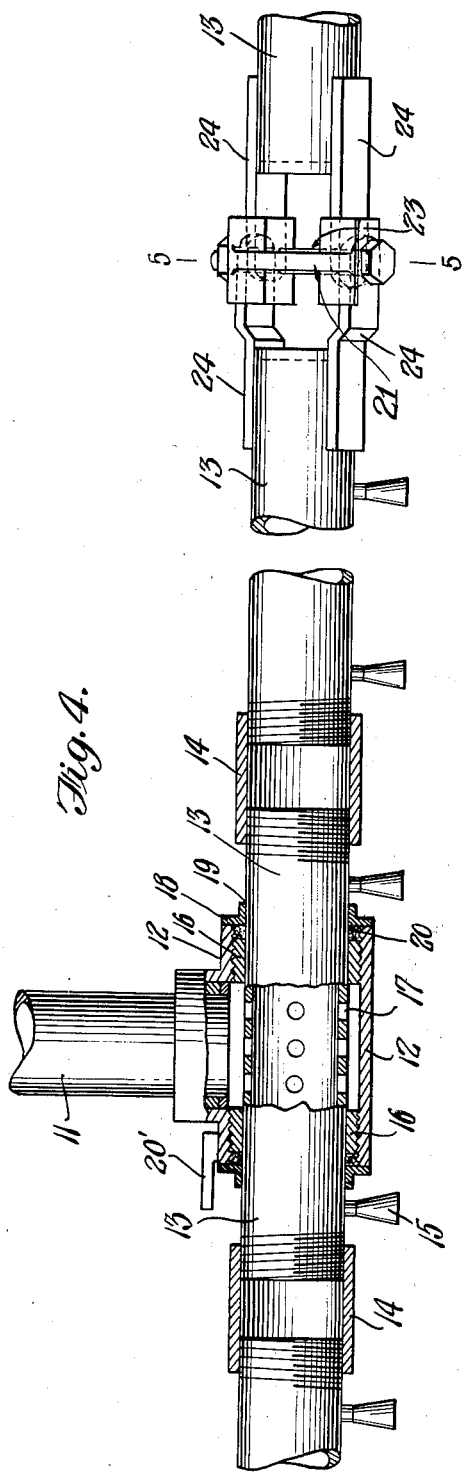
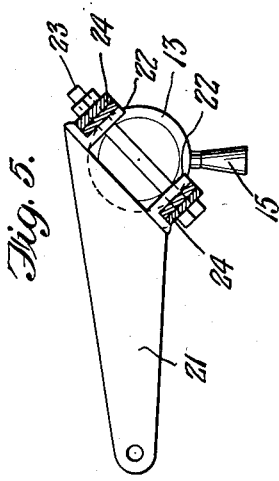
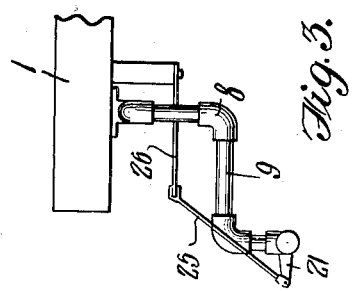
Inventor:
Nathan V. Hendricks,
By C. C. Hines,
Attorney.

Patented Aug. 21, 1934

1,971,262

UNITED STATES PATENT OFFICE 1,971,262

DISTRIBUTOR HEAD FOR DISTRIBUTOR TANKS

Nathan V. Hendricks, Morenci, Mich.

Application July 30, 1932, Serial No. 627,158

11 Claims. (Cl. 299—39)

This invention relates to distributor heads for distributor tanks, and has special reference to improvements in distributor heads for distributor tanks of that kind in which the distributor tank is mounted upon a truck or wheeled vehicle adapted to be self-propelled or suitably drawn over a roadway for the distribution of the surfacing material thereto. More particularly my invention relates to a tank distributor for distributing oil, liquid asphalt, cement or like surfacing material to a roadway and embodying a transverse distributor head arranged at one end of the vehicle and having discharge nozzles for the spraying of the material over the road surface.

One object of my invention is to provide a novel construction of distributor head and means for adjusting the same, whereby the parts may be moved into and out of working position so that the head when in working position will distribute the material over a width of roadway greater than the distance between the wheels of the vehicle, and so that when the parts of the distributor head are disposed out of working position they will lie wholly or approximatey within the line of the wheels and so as to prevent dribbling or leakage of any of the roadway material upon the road surface.

A further object of the invention is to provide a distributor head comprising duplex members or sections, embodying nozzle bars or pipes pivotally mounted to rotate vertically on their axes, and also to swing on vertical axes forwardly and rearwardly or inwardly and outwardly to nonworking and working positions, so as to be disposed for distributing the material over a maximum amount of roadway surface when in use and so as to lie in an out of the way position when not in use.

A still further object of the invention is to provide simple, reliable and efficient adjusting means for the distributor bars or head sections whereby the distributor bars may be inverted and simultaneously swung to lie within the line of the wheels when it is desired to throw the distributing mechanism out of operation, as in the travel of the distributor tank from place to place without a distributing action, so as to prevent dribbling of the material on the road surface without the necessity of removing the nozzle bars or stopping the truck to dispose them in a non-dribbling position.

With these and other objects in view, the invention consists of the features of construction, combination and arrangement of parts, hereinafter fully described and claimed, reference being had to the accompanying drawings, in which:—

Fig. 3 is a side elevation of parts shown in Figs. 1 and 2.

Fig. 4 is an enlarged view, partly in elevation and partly in section, of one of the swiveled delivery pipes and a portion of the distributor head and showing in section the construction of the T piece or bearing between the delivery pipe and one of the nozzle bars.

Fig. 5 is a detail section on line 5—5 of Fig. 4.

Figure 1:
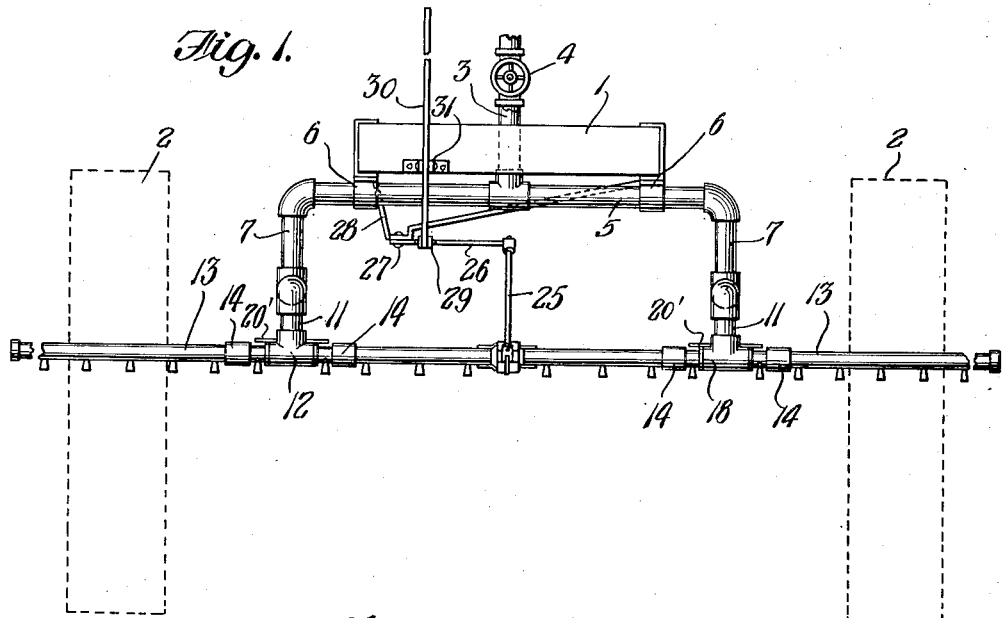
Fig. 1 is an end elevation of the frame of a truck or like vehicle, showing the application of my improved distributor head thereto with parts in working position, and showing in dotted lines the relative position of the wheels.

Referring now more particularly to the drawings, 1 designates the frame portion of a truck or other traveling vehicle adapted in practice to carry the tank (not shown) in which the material to be distributed to the roadway is stored. This traveling vehicle may be of automobile truck type or it may be constructed to be drawn by draft animals or as a trailer behind a truck or other motor driven vehicle. The relative position of the wheels at the end of the vehicle at which the distributor head is arranged is indicated at 2, and these wheels may be mounted upon the vehicle in the customary manner.

The distributor comprises a feed pipe 3 for conducting the material from the storage tank to the distributor head, in which pipe may be a suitable controlling and cut off valve 4. The pipe 3 communicates with the central portion of a U-shaped supply pipe or yoke comprising a transverse main pipe 5 suitably secured, as at 6, to the vehicle frame and having downwardly directed end portions or branches 7 connected by elbows 8 with the rear ends of forwardly projecting horizontal delivery pipes 9. Each pipe 9 terminates at its forward end in an elbow 10 receiving a short vertical pipe section 11 connecting the same with a vertical branch of a T-shaped coupling bearing 12. The delivery pipes 9 are mounted by the elbows 8 to swing or rotate inwardly and outwardly, or transversely of the vehicle in a horizontal plane on the pipe ends 7, and the vertical branches of the T-couplings 12 receive the lower ends of the short pipe sections 11 and are swiveled or pivotally mounted to swing in a horizontal plane thereon.

Figure 2:
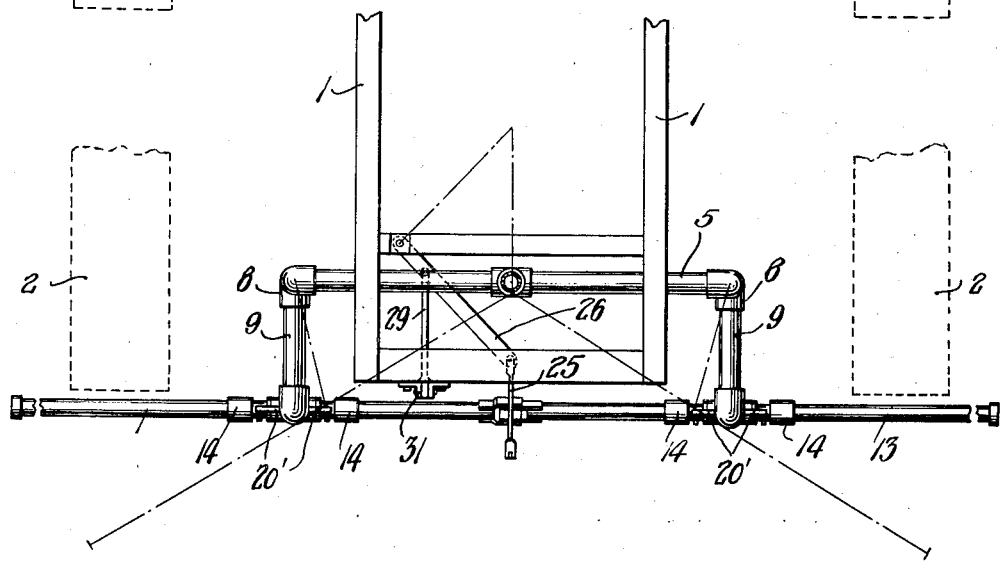
Fig. 2 is a top plan view of the parts illustrated in Fig. 1 and showing in dot and dash lines the positions of the parts when the nozzle bars or distributor pipes are adjusted to non-working position.

The distributor head proper comprises a pair of similar or duplicate nozzle bars or pipes 13 which are mounted centrally within the respective coupling bearings 12 and extend axially through the horizontal limbs or branches thereof. These nozzle bars or pipes consist in practice of pipe sections of suitable length connected by coupling sleeves 14, and each nozzle bar or pipe is closed at its inner and outer ends and carries a longitudinal series of alined nozzles 15 for the discharge of the oil, asphalt or other material therethrough, each nozzle being preferably fan-shaped for discharging correspondingly shaped sprays of the material upon the roadway surface. The wheels 2 of the vehicle are preferably of a suitable broad gage to properly sustain the weight of the vehicle and its load without sinking into the road surface. When the nozzle bars or pipes 13 are in working position they are disposed transversely of the vehicle in axial alinement, as shown in Figs. 1 and 2, with their outer ends extending laterally beyond the wheels 2 so that a portion of roadway surface of greater width than the distance between the wheels will be coated with the material during the distributing operation. Stop arms 20' on the T-fittings are adapted to be engaged by certain of the nozzles 15 to limit the upward rotary motion of the pipes 13 from a working to a non-working position in the T-fittings 12.

The horizontal branches of the respective T-couplings 12 are internally threaded to receive bearing bushings 16 the inner peripheries of which are smooth-surfaced to form bearing members in which the nozzle bars or pipes 13 are fitted to turn or rotate on their axes or in a vertical plane. Between these bearing bushings in the horizontal branches of each T-coupling 12 the branches of the T-coupling communicate with the nozzle bar through annular rows or series of openings 17 in the enclosed portion of the latter, so that when the control valve 4 is open the oil or other material may feed through the delivery pipes into the nozzle bars or pipes 13 for discharge through the nozzles 15 when the latter are in working position. Encompassing the bar or pipe 13 at each end of the T-coupling 12 is a stop collar or sleeve 18 which is secured against movement on the bar 13 by means of a set screw or other similar fastening 19, whereby endwise movement of the bar 13 in the T-coupling 12, or any such movement of the T-coupling on the bar, will be prevented. Packing 20 of a suitable character to prevent leakage at the ends of the coupling 12 is provided between the bushings 16 and sleeves 18.

Suitable mechanism is provided for rotating the pipes 13 in their coupling bearings 12 through an arc of 180°, more or less, to dispose the nozzles 15 in the downwardly projected working position shown in Figs. 1, 2 and 4, or to dispose the bars in an upturned position in which the nozzles 15 project upwardly therefrom, whereby to prevent dribbling or leakage of the material through the nozzles when a feed of the material is not intended, which mechanism also operates to swing the bars 13 in a horizontal plane on the bearings 11—12 to swing the inner end of the bars inwardly and forwardly, assuming the bars to be arranged at the rear end of the truck frame, and to swing the outer ends of said bars outwardly and rearwardly in such an arc as to dispose the bars in V-formation and to bring their outer ends to lie within the line of the wheels 2. The mechanism provided for this purpose comprises a lever arm 21 provided at one end with ears 22 pivotally connected by a bolt 23 with sets of bracket arms 24 welded or otherwise secured to the relatively inner ends of the nozzle bars 13, and arranged with their ends in lapping relation, thus forming a knuckle pin connecting such ends of the nozzle bars so as to be rotated in their bearings 12 by a vertical rocking movement of the lever arm 21, and also coupling the nozzle bars 13 together at their inner ends for longitudinal or forward and backward swinging movement relative to the truck frame 1 on the bearings 12 as pivots rotating on vertical axes. The opposite or free end of the arm 21 is connected by a link 25 with one end of a transmission lever 26, fulcrumed, as at 27, to a suitable supporting bracket 28 on the truck frame. This transmission lever 26 is coupled by a link 29 to the lower end of an operating lever 30 pivotally mounted, as at 31, intermediately of its length on the truck frame 1, the upper end of said lever 30 projecting a suitable distance above the lever fulcrum 31 so as to adapt it to serve as an operating arm whereby it may be conveniently manipulated by an operator or attendant on the vehicle. The arrangement is such that when the operating arm of lever 30 is swung outwardly or rearwardly from the frame 1 motion will be communicated through the link 29 to swing the transverse lever 26 forwardly, thereby pulling on the arm 21 through the link 25 to swing said arm 21 upwardly and forwardly. As a result of this movement of arm 21 the nozzle bars 13 will be turned or rotated on their axes upwardly until the nozzles 15 assume an uppermost position and certain nozzles of the bars engage the stops 20' on the coupling bearings 12, whereupon further movement of the arm 21 will be transmitted to the inner ends of the nozzle bars 13 to swing said ends of the nozzle bars forwardly or toward the truck frame, the nozzle bars swinging in this operation with the T-bearings 12 on the pipes 11 as axes and the bars thus being shifted from a transversely alined working position to a V-shaped folded or non-working position, in which the outer ends of the bars lie rearwardly of their normal position but within the line of the wheels 2. The operation of rotating and swinging the nozzle bars from a discharging and transverse working position to a non-discharging and angularly disposed non-working position will be more readily understood by reference to Figs. 3 and 4 showing the nozzle bars 13 and acting arm 21 and the pivot bolt 23 and coupling arms 24 of the knuckle joint, in the positions they occupy when the nozzle bars are in transversely alined working position and the nozzles 15 are in discharging position. In such positions of the parts named the nozzles 15 depend vertically, the arm 21 projects forwardly in a substantially horizontal plane, while the bolt 23 lies at an angle between the vertical and horizontal and the bars 24 are correspondingly arranged so that they lap and lie edgewise at such an angle to the horizontal as to make the knuckle joint rigid against forward or backward swinging movement of the nozzle bars, thus locking the bars against swinging movement without a preliminary backward rotary releasing movement of the nozzle bars in which the nozzles 15 are turned up to non-discharging position. When the upper end of the operating lever 30 is swung outwardly or rearwardly and its lower end is thereby swung inwardly or forwardly the links 26 and 25 are acted upon to swing the arm 21 upwardly and rearwardly from its forward horizontal position shown in Fig. 1 through an arc of such range as to bring it to lie at an upward and forward angle on the opposite side of or at the front of the nozzle bars. In its swing through this arc the arm 21 rotates the nozzle bars 13 upwardly and forwardly on their longitudinal axes in the coupling bearings 12 until certain of the nozzles 15 engage the stops 20', whereby further rotation of the nozzle bars in such direction is arrested and at which time the nozzles reach an upturned non-discharging or cut-off position. At this time also the coupling bars 24 of the knuckle joint will have been turned to a position in which they lie edgewise horizontally or substantially so and the pivot bolt 23 lies vertically or substantially so, in which positions of such parts the bars no longer oppose pivotal motion of each other on the bolt 23, the knuckle joint being thereby unlocked from a rigid lock-joint condition to permit swinging motion of the inner ends of the bars. A continued pull of the links 26 and 25 on the arm 21 at the end of its preliminary swinging movements results in the inner ends of the nozzle bars being drawn forwardly to swing the bars from the transversely alined working position shown in Figs. 1 and 2 to the dotted line non-working position shown in Fig. 2 in which the bars lie in V-arrangement as hereinbefore described. A reverse movement of lever 30 to return the bars to working position will obviously transmit motion through links 25, 26 to first move arm 21 rearwardly until the bars are swung to longitudinally alined working position, whereby the arm 21 will move backward through the arc of motion previously described, thereby rotating the nozzle bars 13 outwardly and rearwardly on their longitudinal axes in the coupling bearings 12 until the nozzles 15 are again brought to discharge position, at which time the bars will again be disposed to lock the knuckle joint to prevent casual swinging movement of the nozzle bars and to hold them rigidly in longitudinal alinement. It will thus be seen that simple means, including a self-locking and unlocking knuckle joint, are provided for rotating and swinging the nozzle bars and holding them securely in working and non-working positions. The parts may be held in the non-working position described by reason of frictional binding engagement or by the use of suitable fastening means in connection with the operating lever, or otherwise, and when so adjusted, the valve 4 having previously been turned to closed position, and the flow of material to the nozzle bars being thereby cut off, the arrangement of the nozzles 15 will be such as to prevent any dribbling or leakage of the material therethrough out upon the roadway and at the same time the nozzle bars will be disposed so as to lie wholly within the width of the vehicle or within the line of the wheels, so that they will be in a non-interfering position in the transportation of the material from point to point along the roadway in a non-working condition or in the travel of the material from a work point to its home station. Obviously this operation of shifting the bars to non-dribbling and non-working position or to working position, whenever desired, may be easily, simply and quickly effected by single reverse movements of the operating lever 30 by a driver or attendant while the machine is either standing or running, thus obviating the necessity of removing pipes and adjusting them by hand to prescribed positions or otherwise manipulating them for drainage actions or to dispose them in a non-working position ordinarily requiring the truck to be stopped and considerable time to be employed in such work. By means of my invention the nozzle bars are always disposed in position to be instantly thrown into and out of operation and when adjusted to a non-working position the nozzle bars will not only be disposed to prevent dribbling of the material but also to bring them within the line of the wheels so that they will not come in contact with extraneous objects at the sides of the vehicle while the vehicle is in transit. Obviously the invention may be applied to all kinds of tank distributors designed for the distribution of fluent material from a tank or other reservoir to roadways or other surfaces, and its advantages will be evident to those versed in the art without a further and more extended description.

While the construction herein shown, for purposes of exemplification is preferred, it will, of course, be understood that changes in the form, proportions and details of construction of the parts may be made within the scope of the appended claims without departing from the spirit or sacrificing any of the advantages of the invention.

What I claim is:—

1. In a distributor for use on ambulant vehicles for distributing fluid material from a reservoir to a roadway surface, a distributor comprising a plurality of nozzle bars, supporting means for said bars mounting the bars for rotation on their longitudinal axes to dispose their nozzles in discharging or non-discharging positions and also mounting the bars for swinging movement on vertical axes longitudinally of the vehicle for disposing the bars in working position in which they are in longitudinal alinement transversely of the vehicle or non-working position at an angle to each other and to the line of travel of the vehicle, and means for rotating the bars from discharging to non-discharging position and simultaneously swinging them from working to non-working position and rotating them from non-discharging position and simultaneously swinging them from non-working to working position.

2. In a distributor for use on ambulant vehicles for distributing fluid material from a reservoir to a roadway surface, a distributor comprising a plurality of nozzle bars, conducting means communicating with the bars and supporting the bars for rotation on their longitudinal axes to dispose their nozzles in working or non-working positions, said means also supporting the bars for simultaneous swinging of the bars from a working position in which the bars extend transversely of the vehicle to a non-working position in which the bars are disposed at an angle to the line of travel of the vehicle, and means for simultaneously rotating and swinging said bars.

3. In a distributor for use on ambulant vehicles for distributing fluid material from a reservoir to a roadway surface, a conducting support having delivery branches, a pair of nozzle bars arranged on opposite sides of the longitudinal center of the vehicle, said bars being in communication with said branches and mounted for rotation on their longitudinal axes to dispose their nozzles in a downturned working position or an upturned non-working position, and also mounted for simultaneous movement to swing on vertical axes longitudinally of the vehicle for shifting movement of the bars from a longitudinally alined working position transversely of the vehicle to positions in which they lie within the line of the vehicle wheels and at an angle to the direction of travel of the vehicle, and operating means connected to the bars for simultaneously rotating and swinging said bars as set forth.

4. In a distributor for use on ambulant vehicles for distributing fluid material from a reservoir to a roadway surface, a conducting support having delivery branches, bearing members supported by said branches for rotation on vertical axes in a horizontal plane, nozzle bars extending through and journaled in said bearing members for rotation on their longitudinal axes to dispose their nozzles in a downward working position or in an upward non-working position, and operating means connecting the nozzle bars for rotating them in said bearings and shifting the bearings to swing the bars with said bearings as pivots into and out of longitudinal alinement and at right angles or oblique angles to the line of travel of the vehicle.

5. In a distributor for use on ambulant vehicles for distributing fluid material from a reservoir to a roadway surface, a conducting support having delivery branches, conducting bearings supported by said branches for rotation on vertical axes in a horizontal plane, nozzle bars journaled in said conducting bearings for rotation on their longitudinal axes therein, and means connected with said bars for simultaneously rotating them in said bearings and swinging them with said bearings as pivots.

6. In a distributor for use an ambulant vehicles for distributing fluid material from a reservoir to a roadway surface, a conducting support having delivery branches, conducting bearings carried by the branches and supported thereby for rotation on vertical axes in a horizontal plane, nozzle bars in communication with and extending through and journaled for rotation in said conducting bearings, means on the conducting bearings for limiting the rotation of the bars, and means connected with the bars for rotating them in said conducting bearings and swinging them with said bearings as pivots.

7. In a distributor for use on ambulant vehicles for distributing fluid material from a reservoir to a roadway surface, a conducting support having delivery branches, conducting bearings supported by said delivery branches for rotation on vertical axes in a horizontal plane, nozzle bars communicating with, extending through and rotatable on their axes in said conducting bearings, and a lever mechanism connected with the bars for rotating them in said coupling bearings and swinging them with said bearings.

8. In a distributor for use on ambulant vehicles for distributing fluid material from a reservoir to a roadway surface, a conducting support having delivery branches, conducting bearings supported by said delivery branches for rotation on vertical axes in a horizontal plane, nozzle bars communicating with, extending through and rotatable on their axes in said conducting bearings, stops on the coupling bearings to limit the rotation of the nozzle bars, and lever mechanism connected with said bars for rotating the same in said coupling bearings and swinging the same therewith.

9. In a distributor for use on ambulant vehicles for distributing fluid material from a reservoir to a roadway surface, a conducting support having delivery branches, conducting bearings supported by said delivery branches for rotation on vertical axes in a horizontal plane, nozzle bars communicating with, extending through and rotatable on their axes in said conducting bearings, and a lever mechanism pivotally coupled to the inner ends of the bars and operating on reverse motions to rotate the bars on their longitudinal axes in one direction or the other in the coupling bearings and to swing said bars forwardly or rearwardly with said coupling bearings serving as pivots.

10. In a distributor for use on ambulant vehicles for distributing fluid material from a reservoir to a roadway surface, a conducting support having delivery branches, conducting bearings supported by said delivery branches for rotation on vertical axes in a horizontal plane, nozzle bars communicating with, extending through and rotatable on their axes in said conducting bearings, a lever arm connected with the inner ends of the nozzle bars, and a lever mechanism mounted on the vehicle and connected to said lever arm for transmitting motion to said arm to rotate the nozzle bars in their longitudinal axes in the conducting bearings and to swing them longitudinally of the vehicle with said conducting bearings as pivots.

11. In a distributor for use on ambulant vehicles for distributing fluid material from a reservoir to a roadway surface, a conducting support having delivery branches, conducting bearings supported by said delivery branches for rotation on vertical axes in a horizontal plane, nozzle bars communicating with, extending through and rotatable on their axes in said conducting bearings, connecting means pivotally coupling the inner ends of nozzle bars, and a lever mechanism pivotally coupled to said connecting means between the inner ends of the bars and operable therethrough to rotate the bars on their longitudinal axes in the conducting bearings and then swing said bars longitudinally of the vehicle with said bearings as pivots.

NATHAN V. HENDRICKS.